US011459212B2

(12) United States Patent
Praxmarer et al.

(10) Patent No.: US 11,459,212 B2
(45) Date of Patent: Oct. 4, 2022

(54) METHOD FOR ASSEMBLING A CONVEYOR CHAIN FOR A PALLET BELT OF A CONVEYOR

(71) Applicant: INVENTIO AG, Hergiswil (CH)

(72) Inventors: Dominik Praxmarer, Vienna (AT); Gerhard Kleewein, Pressbau (AT); Kurt Streibig, Rekawinkel (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 17/286,635

(22) PCT Filed: Oct. 23, 2019

(86) PCT No.: PCT/EP2019/078829
§ 371 (c)(1),
(2) Date: Apr. 19, 2021

(87) PCT Pub. No.: WO2020/089002
PCT Pub. Date: May 7, 2020

(65) Prior Publication Data
US 2021/0371247 A1 Dec. 2, 2021

(30) Foreign Application Priority Data

Oct. 30, 2018 (EP) .................................... 18203448

(51) Int. Cl.
*B66B 23/02* (2006.01)
*B65G 17/42* (2006.01)
*B66B 23/10* (2006.01)

(52) U.S. Cl.
CPC ............ *B66B 23/024* (2013.01); *B65G 17/42* (2013.01); *B66B 23/02* (2013.01); *B66B 23/10* (2013.01)

(58) Field of Classification Search
CPC ....... B66B 23/02; B66B 23/024; B66B 23/10; B66B 21/10; B65G 17/42; B65G 17/40
(Continued)

(56) References Cited

U.S. PATENT DOCUMENTS 2,059,063 A 10/1936 Tourville
2,987,167 A * 6/1961 Franz ..................... B65G 17/06
198/853

(Continued)

FOREIGN PATENT DOCUMENTS

EP 0795512 B1 7/2000
EP 0934171 B1 9/2001
WO WO 2013/152714 A1 10/2013

OTHER PUBLICATIONS

International Search Report for International Application No. PCT/EP2019/078829 dated Feb. 11, 2020.

*Primary Examiner* — James R Bidwell
(74) *Attorney, Agent, or Firm* — Knobbe Martens Olson & Bear LLP

(57) ABSTRACT

A method for mounting a conveyor chain for a pallet belt of a moving walkway is described. Provided elongated connecting elements for fastening pallets are coupled in one coupling process to one another and to chain links, which are coupled to one another, such that the connecting elements are arranged one behind the other parallel to the extension direction of the conveyor chain, each of the connecting elements is coupled at a front end to an associated first one of the chain pins, and at a rear end to an associated second one of the chain pins, wherein a connecting element spacing distance between the first and second chain pins is an integer multiple of the chain spacing distance.

17 Claims, 5 Drawing Sheets

(58) Field of Classification Search
USPC ................ 198/321, 326, 850, 851, 852, 853
See application file for complete search history.

(56) References Cited

U.S. PATENT DOCUMENTS

| | | | | |
|---|---|---|---|---|
| 4,232,783 | A * | 11/1980 | Kraft | B66B 23/024 |
| | | | | 198/851 |
| 4,244,457 | A * | 1/1981 | Ernst | B66B 23/10 |
| | | | | 198/321 |
| 6,640,957 | B2 * | 11/2003 | Fargo | B66B 21/10 |
| | | | | 198/321 |
| 8,424,667 | B2 * | 4/2013 | Gonzalez Alemany | ................. |
| | | | | B65G 17/40 |
| | | | | 198/327 |
| 8,931,614 | B2 * | 1/2015 | Senger | B66B 23/10 |
| | | | | 198/327 |
| 2013/0180822 | A1 * | 7/2013 | Senger | B66B 23/024 |
| | | | | 198/321 |
| 2015/0307327 | A1 * | 10/2015 | Srb-Gaffron | B66B 23/024 |
| | | | | 198/321 |
| 2017/0197809 | A1 | 7/2017 | Matheisl et al. | |
| 2017/0297873 | A1 | 10/2017 | Turek | |

* cited by examiner

METHOD FOR ASSEMBLING A CONVEYOR CHAIN FOR A PALLET BELT OF A CONVEYOR

TECHNICAL FIELD

The present disclosure relates to a method for mounting a conveyor chain for a pallet belt of a moving walkway, to a method for replacing a connecting element in a conveyor chain, and to a method for mounting a pallet belt for a moving walkway.

SUMMARY

Moving walkways are used as passenger transport systems for the purpose of transporting persons within a structure along a normally horizontal or only slightly inclined travel path. For said purpose, a moving walkway has a pallet belt, on which passengers can stand and which can be moved continuously along the travel path. On the pallet belt, a multiplicity of pallets is arranged one behind the other. Each of the pallets is usually mounted between two conveyor chains which are arranged along opposite sides of the pallet belt. In turn, each of the conveyor chains comprises a multiplicity of elongated chain links which are arranged one behind the other at a spacing distance and are pivotably connected to one another via chain pins, and so the entire conveyor chain is highly stressable with regard to tension. In this case, the spacing distance corresponds essentially to the distance between the central longitudinal axes of the chain pins.

The pallet belt is arranged continuously. This can mean that the pallets can be moved in a forward direction along the travel path by the conveyor chains. At the ends of the travel path, the pallet belt is deflected by deflection devices, so that the pallets can be moved with the annularly closed pallet belt in the opposite return direction back to the beginning of the travel path. Corresponding deflection devices generally have deflection sprockets which each interact with one of the conveyor chains in order to generally deflect said conveyor chains by 180° from the forward direction to the return direction, or vice versa.

If a moving walkway is supposed to be installed in a structure to be newly built, it can be provided that at least parts of the moving walkway are integrated in a floor of the structure, and so a running surface formed by the pallets in the forward direction can be as flush as possible with a surface of said floor. For this purpose, it can be advantageous to provide moving walkways with a low design height in order to avoid the provision of deep cavities in the floors of the structure, in which the moving walkway can be accommodated.

If a moving walkway is to be retrofitted in an existing structure, it may in some cases not be possible or at least be very expensive, for example, for reasons of statics, to lower said moving walkway at least partially into a floor of the structure. In this case, the moving walkway must be constructed on the floor of the structure. Advantageously, a height difference between a level, at which the running surface of the moving walkway runs, and a level of the surrounding floor should be as small as possible. For this case of application, it is thus particularly desirable to use a moving walkway with a particularly low design height.

The design height of a moving walkway is determined significantly by the design height of its deflection devices and particularly by a diameter of the usually vertically arranged deflection sprockets inserted therein. When using deflection sprockets with a very small diameter, the result can be the occurrence of so-called polygon effects due to the fact that not any type of narrow pallets can be used; instead, for practical use, the pallets have a minimum length (measured in the direction of the travel path). Such polygon effects can noticeably occur when the length of the pallets, and consequently also a spacing distance of the conveyor chain, are not sufficiently small in comparison to the diameter of the deflection sprockets. In order to avoid polygon effects, a minimum number of no less than 17 teeth of the deflection sprockets and thus a minimum design height was generally used in conventional moving walkways.

WO 2013/152714 A1 describes a pallet belt for use in a conveyor system, particularly a moving walkway. The pallet belt described has two conveyor chains and pallets arranged between them. Due to its structural design, this pallet belt can, to a certain extent, help to limit polygon effects, even when using small deflection sprockets. However, the structural design of the pallet belt described is relatively fragile and has a multitude of safety-relevant components that could lead to dangerous situations for the users in case of an incorrect installation or their failure.

Among others, there may be a need for a method for mounting a conveyor chain for a pallet belt, a method for replacing an element of the conveyor chain, and/or a method for mounting a pallet belt, in which or by means of which some of the above-mentioned problems or limitations, among others, are advantageously overcome in the mounted conveyor chain or the mounted pallet belt. In particular, there may be a need for a method for mounting a conveyor chain or a pallet belt, by means of which a pallet belt can be mounted in a simple manner and with relatively little effort, and which can be used with high reliability in a moving walkway with small design height without provoking excessive polygon effects.

Such a need can be met with the subject matter described herein. Advantageous embodiments are defined throughout the following description.

According to a first aspect, a method for mounting a conveyor chain for a pallet belt of a moving walkway is escribed. The method comprises at least the following steps, possibly, but not necessarily, in the order provided: A plurality of elongated chain links are provided, which are arranged at a chain spacing distance one behind the other in an extension direction of the conveyor chain. In this case, two chain links adjacent in the extension direction are coupled together in a joint area by means of a chain pin and the chain links are connected by the chain pin in stressable manner with regard to tension and pivotably to one another transversely to the extension direction about a central longitudinal axis of the chain pin. Furthermore, a plurality of elongated connecting elements is provided, to which pallets can be attached. The connecting elements are coupled to one another and to the chain links in one coupling process, wherein:

the connecting elements are arranged one behind the other parallel to the extension direction of the conveyor chain, each of the connecting elements is coupled at a front end to an associated first one of the chain pins, which couples chain links, and at a rear end, to an associated second one of the chain pins, which couples chain links, wherein a connecting element spacing distance between the first and second chain pin is an integer multiple of the chain spacing distance; and the connecting elements are coupled to the chain pins such that they can be pivoted transversely to the extension direction about the central longitudinal axes of the chain pins.

In some embodiment of the first aspect, two connecting elements adjacent in the extension direction can each be arranged to overlap one another. For that purpose, a rear end of a front one of the two connecting elements and a front end of a rear one of the two connecting elements are each coupled to a common chain pin.

In further embodiments of the first aspect, the front end of each of the connecting elements can be coupled pivotably and in a coaxially positioned manner to the respective first chain pin, and the rear end of each of the connecting elements can be pivotably coupled to the respective second chain pin and guided in the extension direction in a displaceably linear manner over a predetermined distance. In the coupling process, at least one of the connecting elements can thus first be coupled to the associated chain pin with a first of the two ends by sliding it on in the axial direction and then can be coupled to the coupling pin associated with the second end, which is opposite the first end in the tangential direction, by pivoting in a pivoting direction.

In the present document, the features "coupling," "couple," and "coupled" refer to a connection that allows relative movements between the coupled parts, but does not allow a separation of the coupled parts without additional effort. Such an additional effort can be, for example, the loosening of a screw, a nut, a cotter pin, the actuation of a snap-action device, or even an irreversible destruction of a coupling component, and the like, in order to disengage the coupling of the parts.

According to a second aspect, a method for replacing a connecting element in a conveyor chain is described. The conveyor chain was mounted in accordance with a method as described herein and has corresponding structural properties resulting from the mounting method. The method has at least the following steps, possibly, but not necessarily, in the specified order: the connecting element to be replaced is pivoted with its second end in the tangential direction counter to the pivoting direction in order to thereby decouple the second end from the associated second chain pin. The connecting element to be replaced is then released from the associated first chain pin by pulling the first end off in the axial direction. The connecting element released in this manner is then replaced by a replacement connecting element. The replacement connecting element is first coupled at a first end to the associated first chain pin by sliding it in the axial direction, and then the replacement connecting element is coupled at the opposite second end to the associated second chain pin by pivoting the replacement connection element in the pivoting direction.

According to a third aspect, a method for mounting a pallet belt for a moving walkway is described. The method has at least the following steps, possibly, but not necessarily, in the specified order: a first and a second conveyor chain are mounted according to embodiments of the first aspect. Then, the two conveyor chains are arranged parallel to one another. Subsequently, a plurality of pallets is attached to the two conveyor chains, wherein the pallets are arranged one behind the other in the extension direction of the conveyor chains. For that purpose, each of the pallets is fastened at a first lateral end to one of the connecting elements of the first conveyor chain and at an opposite second lateral end to one of the connecting elements of the second conveyor chain.

The methods described herein allow for a structured and secure mounting of interlocking and overlapping elements or components of a conveyor chain or a pallet belt. With these interlocking and overlapping elements, a high degree of operational safety can be ensured. The specific design of the interlocking and overlapping elements also requires a structured approach for the replacement of elements.

Briefly summarized, possible features and advantages of embodiments of the disclosure can be considered, among others and without delimiting the disclosure, to be based on the concepts and findings described below.

In case of conventional pallet belts for moving walkways, pallets were usually directly connected to possibly elongated chain pins of the conveyor chains. In most cases, conveyor chains with a relatively large spacing distance were used, and so the length of the pallets essentially corresponded to the spacing distance of the conveyor chains.

If a short spacing distance for the conveyor chains was to be realized using short chain links, as is the case, for example, in the approach described in WO 2013/152714 A1, the pallets would still be connected directly to the chain pin of the conveyor chains. However, a single pallet spanned the length of several chain links, and so between a coupling of the pallet to a front chain pin and a coupling of the pallet to a rear chain pin, one or more chain pins remained which were not connected to the pallet.

Since the deflection of the conveyor chain at a deflection sprocket in such a configuration results in a difference in length between the area of the conveyor chain running along the circumference of the deflection sprocket and the pallet extending linearly in between, said difference in length must be compensated by a suitable mechanism. Conventionally, this mechanism is provided in the area of the connection of the pallets to one or more of the chain pins, with which the pallets are supposed to be coupled. The structure of such a mechanism can be complex and/or sensitive. In addition, with this type of connection of the pallets to the conveyor chains, it can be expensive to mount and/or to disassemble the pallet belt, for example, as part of a maintenance process and/or to replace, for example, defective parts of the pallet belt.

Embodiments of the mounting method described herein make it possible to be able to mount a structurally and functionally specifically designed conveyor chain in a simple manner or to simply disassemble or replace components contained therein.

In the case of the conveyor chain, the pallets are not connected directly to the chain pins of the conveyor chain. Instead, specific connecting elements are provided, to which the pallets can be attached. These connecting elements form a type of additional chain which runs parallel to the respective conveyor chain, wherein the connecting elements are many times longer than the chain links of the conveyor chain, for example, the additional chain formed by the connecting elements has a greater spacing distance than the chain formed by the chain links. In other words, a connecting element overlaps a plurality of chain links. In such case, the connecting elements are coupled to some of the chain pins of the conveyor chain, which also couple the chain links Since the connecting elements are longer than the chain links of the conveyor chains, the opposite ends of the connecting elements are each coupled to every second, every third, or more generally every nth (n>2) chain pin, for example, at least one chain pin not coupled to the connecting element is located between two chain pins that are coupled to a connecting element.

In this case, the connecting elements are designed to be structurally suitable in order to be able to compensate for the differences in length which occur between the shorter chain links of the conveyor chains and the comparatively longer connecting elements during the deflection of the conveyor chains. As a result, the conveyor chain can be deflected even with deflection sprockets with a small diameter without polygon effects having undesirable impacts.

Since the pallets are not directly connected to the chain pins but are indirectly connected to the chain pins via the connecting elements, it is possible, among others, to mount, disassemble or replace the pallets and/or other components of the pallet belt in a simple manner.

In particular, the connecting elements can be designed in such a way that at their second end they do not necessarily need to be coupled in the axial direction to the associated chain pin, but instead can be pivoted and thereby coupled to the associated chain pin in the tangential direction. In this manner, adjacent connecting elements, which are coupled with their opposite ends to a common chain pin, can be detached individually from the respective chain pin.

Accordingly, in the event that individual connecting elements or pallets attached thereto are supposed to be replaced, for example, due to wear, not all the connecting elements need to be detached from the chain formed by the chain links. For example, individual connecting elements can be detached and replaced instead.

BRIEF DESCRIPTION OF THE DRAWINGS

Embodiments of the disclosure will be described in the following with reference to the accompanying drawings, with neither the drawings nor the description being intended to be interpreted as limiting the invention. It must be noted that some of the possible features and advantages of the disclosure are described with reference to different embodiments of the conveyor chain, the pallet belt, or the moving walkway, or with reference to different embodiments of a method for mounting a conveyor chain, a method for replacing a connecting element in a conveyor chain, or a method for mounting a pallet belt for a moving walkway. A person skilled in the art recognizes that the features can be combined, transferred, adapted, or replaced in a suitable manner in order to arrive at further embodiments of the disclosure.

The drawings are merely schematic and not true to scale. In the different drawings, identical reference signs denote identical or similar features.

DETAILED DESCRIPTION

In order to be able to better understand the method steps of the mounting method according to the disclosure, the various components of the pallet belt 3, on which the mounting method is based, and their arrangement relative to one another shall first be described with reference to FIGS. 1 to 4c.

Figure 1:
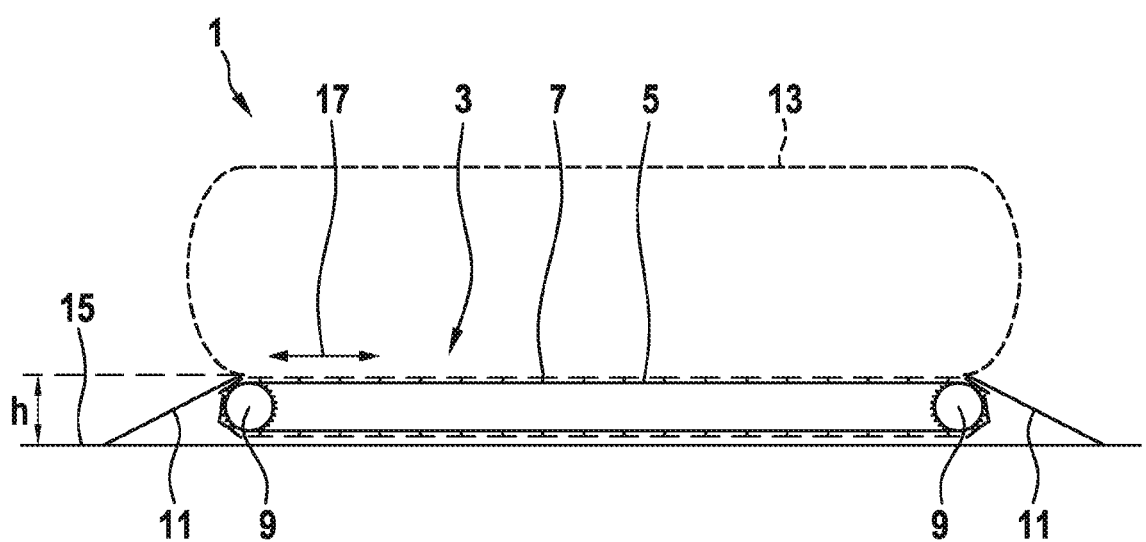
FIG. 1 shows a rough schematic longitudinal sectional view of a moving walkway according to an embodiment.

FIG. 1 shows roughly schematically a moving walkway 1, by which passengers can be transported along a horizontal travel path. The moving walkway 1 has a pallet belt 3, the accessible, upward facing portion of which extends along the travel path in an extension direction 17. During operation of the moving walkway 1, said accessible portion of the pallet belt 3 is moved in a forward direction. The pallet belt 3 is annularly closed or arranged continuously and is deflected at opposite ends of the moving walkway 1 by means of deflection sprockets 9, and so a downward facing portion of the pallet belt is moved back in a return direction. In order to be able to access the pallet belt 3 in a simple and stepless manner, oblique ramps 11 are provided in an entrance area as well as in an exit area. In addition, a handrail 13 is arranged along the travel path, which, for reasons of clarity, is shown only as a broken line.

The pallet belt 3 comprises two conveyor chains 5 and a plurality of pallets 7 held on said conveyor chains 5. The conveyor chains 5 are arranged parallel to one another and, relative to a width direction (perpendicular to the image plane) of the moving walkway 1, on opposite sides of the moving walkway 1. Each conveyor chain 5 is composed of a multiplicity of chain links, which are pivotably coupled to one another by means of chain pins. The pallets 7 are mechanically connected to the two conveyor chains 5, and so the pallets 7 are moved along the travel path when the conveyor chains 5 are moved.

In the example shown, the moving walkway 1 is constructed on a floor 15. In such case, a design height h should be as low as possible, for example, to delimit a length or incline of the ramps 11. Due to such a desired low design height h, the diameter of the deflection sprockets 9 should also be as small as possible.

In conventional moving walkways, a length of the chain links forming the conveyor chain, measured along the extension direction, essentially corresponds to a length of the pallets. In other words, a spacing distance of the conventional conveyor chain essentially corresponds to a spacing distance of the conventional pallet belt formed with said conveyor chain. In this manner, a pallet is connected both at its front end and its rear end to one of the chain pins at the opposite ends of the chain link running parallel to the pallet 7.

However, the deflection of the relatively long chain links, including the pallets 7 connected thereto, can lead to significant polygonal effects if the spacing distance of the conveyor chain 5 or the pallet belt 3 is not significantly smaller than a diameter of the deflection sprockets 9. It became particularly apparent that in case of deflection sprockets 9, which are designed as toothed wheels and in which one tooth each is supposed to mesh with a recess formed in a chain link, noticeable polygon effects occur if the deflection sprocket 9 has less than 17 teeth.

The present disclosure relates to a moving walkway 1 and its components, particularly the pallet belt 3 and the conveyor chain 5, and a method for mounting or repairing such components, in which the moving walkway 1, due to its structural and functional properties, can be provided with a low design height h without unacceptable strong polygonal effects occurring during the deflection of the pallet belt 3. Furthermore, the present disclosure increases the operational reliability of the moving walkway 1 due to its specific structural characteristics. In addition, the conveyor chain 5 or the pallet belt 3 formed by said conveyor chain 5 can be easily mounted and the components contained therein can be easily replaced if necessary.

In the following, possible details and advantages of embodiments of the present disclosure shall be described with reference to the drawings. At first, mainly structural or functional properties of the conveyor chain 5, the pallet belt 3 formed by said conveyor chain 5, or of the moving walkway 1 ultimately provided therewith shall be described. Subsequently, possible embodiments of a method for mounting such a conveyor chain 5 or such a pallet belt 3 as well as a method for replacing connecting elements in such a conveyor chain 5 shall be described.

It must be noted that features described for devices, such as the conveyor chain 5, the pallet belt 3, or the moving walkway 1, can have corresponding effects on the respective methods for their mounting and repair, and conversely, features of the methods described herein can, in turn, correlate with properties of the devices thus formed.

Figure 2:
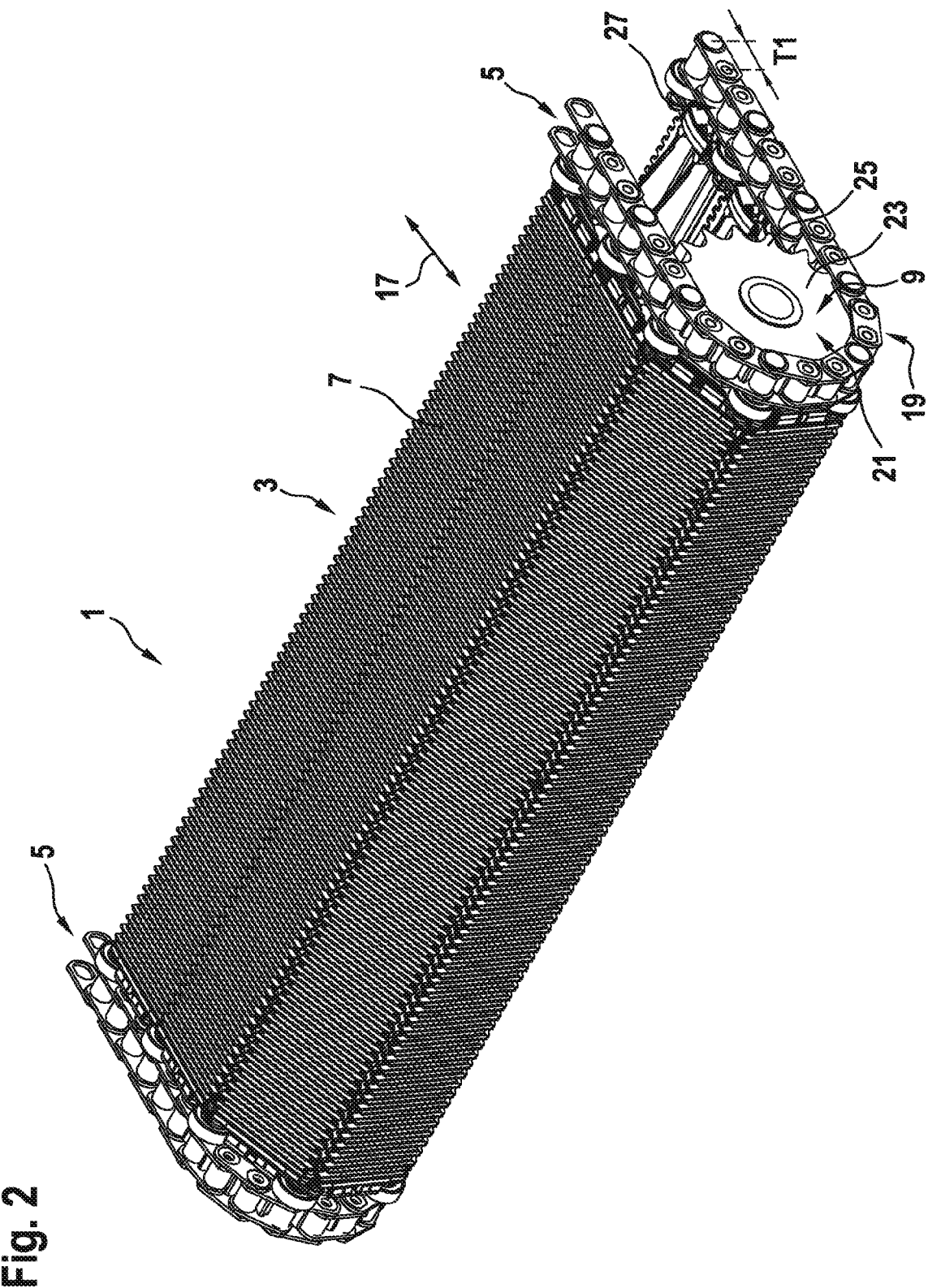
FIG. 2 shows a perspective view of a part of a pallet belt for a moving walkway with a conveyor chain which has been mounted according to an embodiment of the present disclosure.
Figure 3:
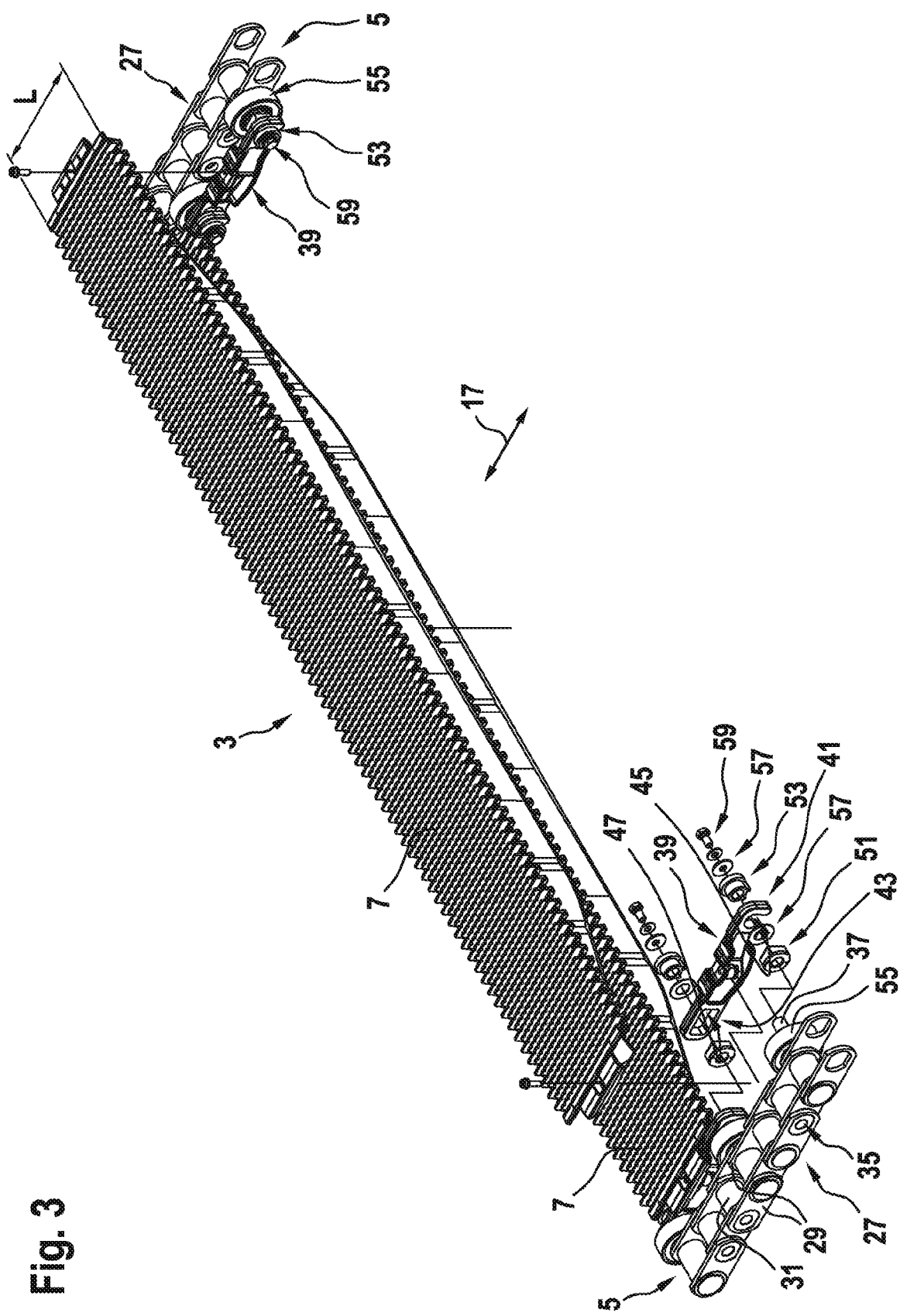
FIG. 3 shows a further perspective view of a part of the conveyor belt shown in FIG. 1 partially in an exploded view.
Figure 4A:
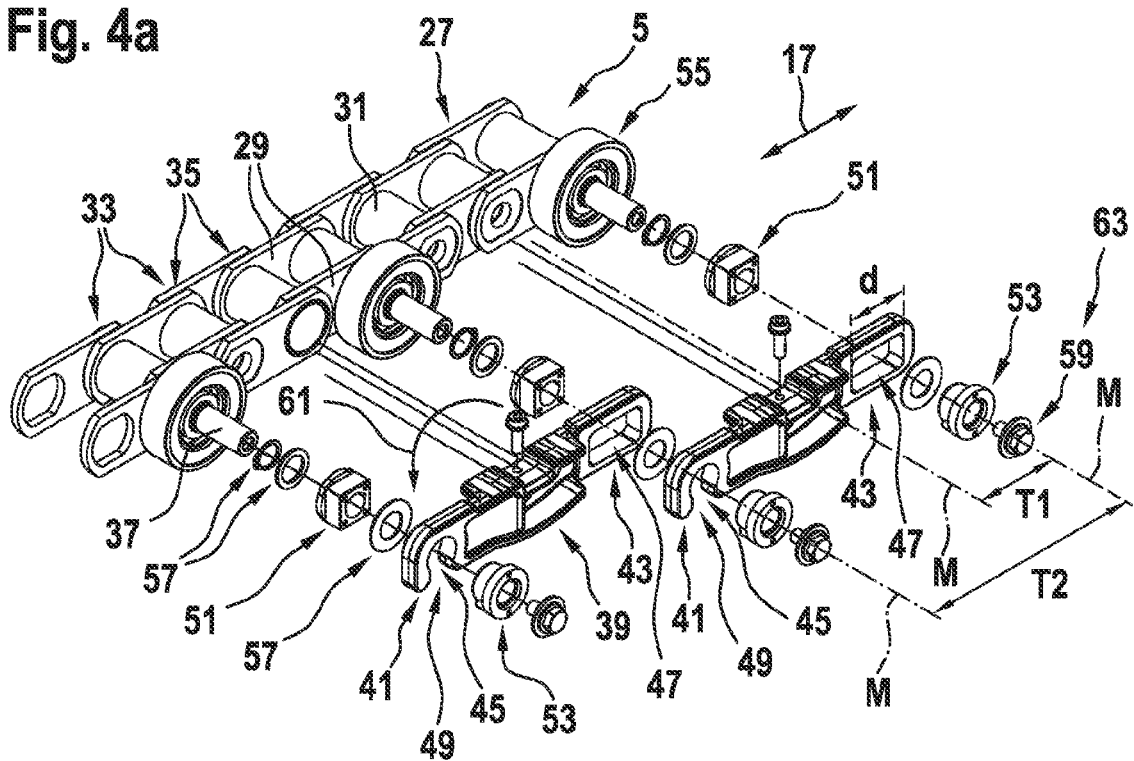
FIGS. 4a-c show a perspective exploded view, a perspective front view, and a perspective rear view of a segment of a conveyor chain to be mounted according to an embodiment of the present disclosure.
Figure 4B:
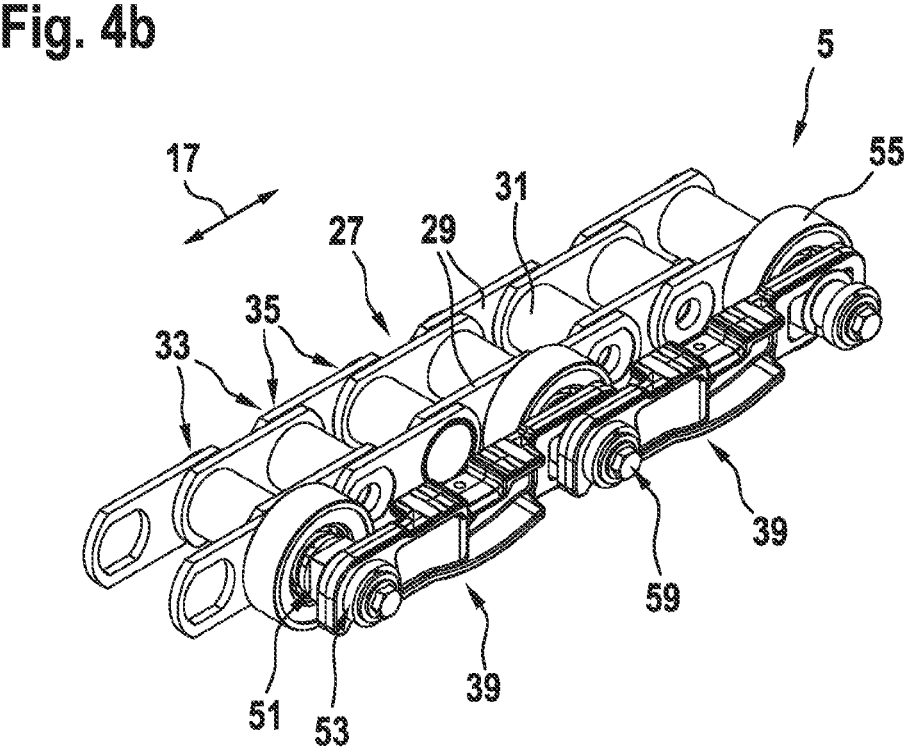
Figure 4C:
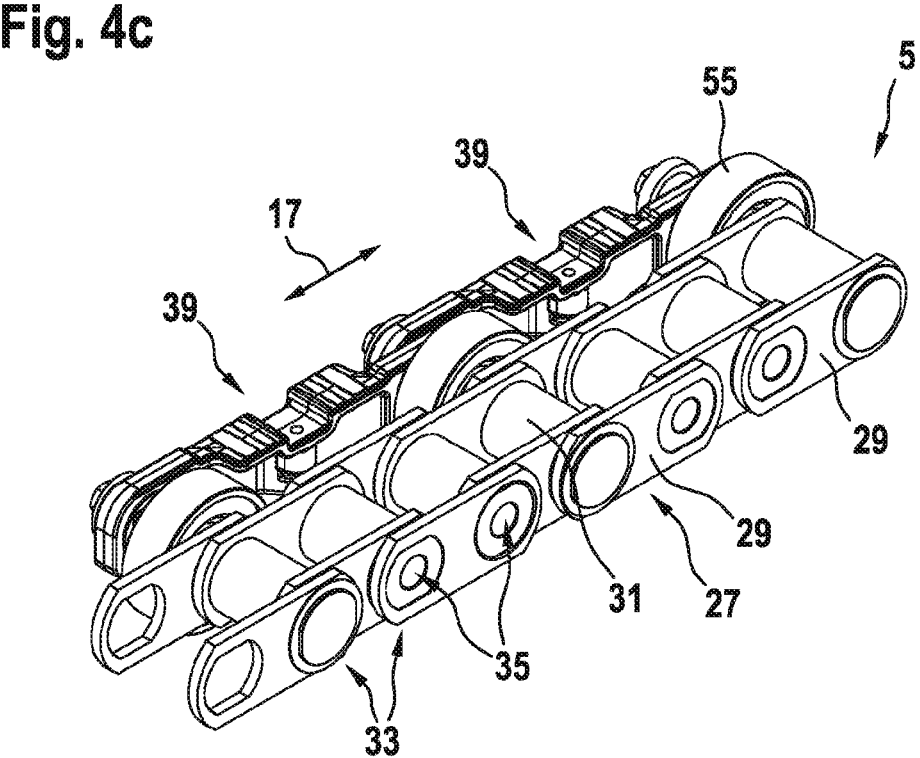

FIG. 2 perspectively shows a part of a moving walkway 1 in a deflection area 19. In the deflection area 19, the pallet belt 3 is deflected by means of a deflection device 21 from a forward direction to a return direction, or vice versa. For this purpose, the deflection device 21 has deflection sprockets 9 in the form of toothed wheels 23, which are arranged on opposite sides of the pallet belt 3 and interact with conveyor chains 5 running on said sides. The deflection sprockets 9 have a small diameter, for example, of less than 40 cm, preferably less than 30 cm, and more preferably less than 25 cm, and so the entire moving walkway 1 can have a low design height h, for example, well below 50 cm, preferably even below 35 cm.

However, since a chain spacing distance T1 for the conveyor chains 5 is short, the teeth 25 formed on the toothed wheel 23, which mesh with individual chain links 27 of the conveyor chain 5, can be arranged closely adjacent to one another. Accordingly, at least 17 teeth 25 can be provided on the outer circumference even with the small deflection sprocket 9, and so polygon effects can remain negligible when the conveyor chains 5 circulate.

FIGS. 3 and 4a to 4c perspectively show details, partly as exploded views, of the pallet belt 3 and the conveyor chain 5 inserted therein. In the following, they shall be described together.

The conveyor chain 5 has a plurality of elongated chain links 27. The chain links 27 are arranged one behind the other along the extension direction 17 of the conveyor chain 5. In the example shown (see particularly FIG. 4a), each chain link 27 is designed with two sheet-like brackets 29 arranged in a parallel manner. The brackets 29 are spaced apart from one another by sleeves 31. Chain links 27, adjacent in the extension direction 17, are each connected to one another in a joint area 33 by means of a chain pin 35. As a result, the conveyor chain 5 is stressable with regard to tension and pivotable transversely to the extension direction 17 about respective central longitudinal axes M of the chain pins 35.

A distance of the central longitudinal axes M between two adjacent chain pins 35 on the conveyor chain 5 corresponds to the chain spacing distance T1. In order to achieve the desired negligible polygon effects during the deflection of the conveyor chain 5, the individual chain links 27 of the conveyor chain 5 are so short that the chain spacing distance T1 is preferably shorter than 10 cm, more preferably shorter than 6 cm, and particularly 50 mm±2 mm.

In conventional pallet belts 3, the pallets 7 are usually connected directly to the chain pins 35 of the conveyor chains 5. For example, the pallets 7 are connected at lateral end faces directly to elongated chain pins 35 which protrude laterally over the conveyor chains 5.

By contrast, in the pallet belt 3 proposed herein, additional elongated connecting elements 39 are provided on the conveyor chain 5. Similarly to the chain links 27, the connecting elements 39 are arranged one behind the other in the extension direction 17 or parallel to said extension direction 17. In this case, two connecting elements 39 adjacent in the extension direction 17 are pivotably coupled to one another transversely to the extension direction 17. For example, such a coupling can be achieved via elongated chain pins 37 of the conveyor chain 5, which protrude laterally over the chain links 27, and with which the connecting elements 39 can be connected.

In particular, each of the connecting elements 39 can be coupled at a first end 41 to an associated front one of the elongated chain pins 37, and at a rear end 43, it can be coupled to an associated second one of the elongated chain pins 37.

A distance in the extension direction 17 between the central longitudinal axes M of the first and the second elongated chain pin 37 is herein referred to as connecting element spacing distance T2. For the conveyor chain 5 described herein, this connecting element spacing distance T2 is supposed to be an integer multiple of the chain spacing distance T1, for example, T2=n*T1 with n=2, 3, 4 . . . . In the depicted example, the connecting element spacing distance T2 is three times the chain spacing distance, for example, T2=3*T1. In other words, the connecting elements 39 are supposed to be longer than the chain links 27 by an integer multiple, for example, two or three times longer than the chain links 27.

As a result, each of the connecting elements 39 is not connected at its opposite ends 41, 43 to directly adjacent chain pins 35, 37. Instead, at least one chain pin 35, 37, which is not coupled to the connecting element 39, is located between two chain pins 35, 37 which are connected to one of the respective ends 41, 43 of the connecting element 39. In other words, each of the connecting elements 39 is coupled to only every other, every third, or generally every nth chain pin 35, 37.

In the example shown, the connecting elements 39 are coupled at their ends 41, 43 to every third chain pin 35, 37, wherein said chain pins 35, 37 are then designed as elongated chain pins 37. Between such elongated chain pins 37, two shorter chain pins 35 are located, which only connect the chain links 27 of the conveyor chain 5, but which are not connected to the connecting element 39 running parallel thereto.

In the described pallet belt 3, the pallets 7 are not directly connected to the conveyor chain 5. Instead, the pallets 7 are each attached to the connecting elements 39 and connected indirectly via said connecting elements 39 to the conveyor chain 5.

In such case, a length L of the pallets 7, measured in the extension direction 17, can correspond approximately to the connecting element spacing distance T2 and thus be many times longer than the length of the chain links 27 and their chain spacing distance T1. In general, the pallets 7 are hereby slightly shorter than the connecting element spacing distance T2, and so a small gap remains between adjacent pallets 7, and the pallets 7 can thus move relative to one another. Specifically, for example, a pallet length of almost 150 mm can be used for a conveyor chain 5 with a chain spacing distance T1 of 50 mm, and so each of the pallets 7 spans or "overlaps" a plurality of chain links 27.

When such a pallet belt 3 is deflected in a deflection area 19, the conveyor chain 5 with its chain links 27 then virtually travels a radian measure of a pitch circle along the outer circumference of one of the deflection sprockets 9. However, the long pallets 7 extend along chords between the chain links 27 which are overlapped by said pallets 7. In other words, the pallets 7 do not extend along the traverse defined by the chain pins 35, 37 during deflection, but along straight lines that connect those chain pins 35, 37, to which the connecting elements 39 are connected. The length of said chords is shorter than the length of the circumference or said traverse. This can be called chord shortening.

In order to be able to compensate chord shortenings occurring due to the connecting elements 39 which are longer when compared to the chain links 27, a specific design of the connecting elements 39, or the manner in which they are connected to the conveyor chain 5, is necessary. In particular, at least one of the ends 41, 43 of each connecting element 39 should be coupled to the conveyor chain 5 such that a length adjustment for compensating the chord shortening can be created.

For further clarity, the extended chain pins 37 described with a specific connecting element 39 shall in the following be called associated chain pins 37. Furthermore, the elongated chain pins 37, which interact with a specific area of the connecting element, are termed the first of the chain pins 37 and the second of the chain pins 37, or the first chain pin 37 and the second chain pin 37 in order to be able to describe their arrangement with respect to the associated connecting element 39. For the same reason, the ends of the connecting element 39 are referred to as the front end 41 and the rear end 43, wherein these designations are not supposed to specify a movement direction of the connecting element 39 in the extension direction.

In order to compensate for the chord shortening, for example, the front end 41 of a connecting element 39 can be coupled pivotably and in a coaxially positioned manner to the first chain pin 37.

In other words, the front end 41 of the connecting element 39 can be coupled to the first chain pin 37 such that the connecting element 39 is pivotable about the central longitudinal axis M of the first chain pin 37, but in directions transverse to the center longitudinal axis M of the chain pin 37, it is fixed in position relative to the chain pin 37. Even though the front end 41 of the connecting element 39 is thus connected to the conveyor chain 5 so as to be pivotable about the central longitudinal axis M of the chain pin 37, it cannot be displaced linearly relative thereto. In other words, the connecting element 39 can be interlockingly connected at its front end 41 to the first chain pin 37 such that only pivoting movements about the central longitudinal axis M of the chain pin 37 are possible, but no translational movements in the extension direction 17 relative to the chain pin 37 are possible.

By contrast, the rear end 43 of each of the connecting elements 39 can be coupled to the second chain pin 37 both pivotably and, in the extension direction 17 over a predetermined distance d, guided in a displaceably linear manner.

In other words, the rear end 43 of the connecting element 39 can be coupled to the second chain pin 37 such that the connecting element 39 is pivotable about the central longitudinal axis M of the second chain pin 37, and is additionally displaceable relative to the chain pin 37 over the predetermined distance d in a direction transversely to said central longitudinal axis M, and, due to the design of the coupling between the connecting element 39 and the second chain pin 37, it is guided in its linear movement. In still other words, the connection of the rear end 43 of the connecting element 39 to the second chain pin 37 can be designed such that said rear end 43 can move translationally relative to the second chain pin 37 in the direction transversely to the central longitudinal axis M of the chain pin 37.

In this case, a linear movement over the distance d is supposed to be possible. Said distance d can be equal to or greater than the length of the aforementioned chord shortening. In other words, the distance d can correspond to the length, by which the chord between the first and second chain pins 37 differs from the circumference along a circular segment when the conveyor chain 5 is deflected around the circular segment. For example, the distance d can correspond to at least 150% or preferably at least 200% of the diameter of the second chain pin 37.

The connecting elements 39 described herein and their connection to the conveyor chain 5 virtually create a parallel chain, the spacing distance of which is significantly greater than that of the chain links 27 and essentially corresponds to the length of the pallets 7. Due to the structural and functional design of the connecting elements 39 at their first and second ends 41, 43 and the manner in which these ends are coupled to the chain pins 37 of the conveyor chain 5, it can be achieved that a chord shortening, as it is effected when the pallet belt 3 is deflected, can be compensated at the connecting elements 39.

According to one embodiment, each of the connecting elements 39 can be detachably coupled to the associated chain pin 37 on at least one of its ends 41, 43 in a direction transverse to the extension direction 17 and transverse to the center longitudinal axis M of the chain pin 37 to which the respective end 41, 43 is coupled.

In other words, the connecting elements 39 can be designed in such a way that at one of their ends they can be detached from the associated elongated chain pin 37 by said end 41, 43 being moved in the direction transverse to the extension direction 17 and transverse to the central longitudinal axis M of the chain pin 37. In other words, one of the ends 41, 43 of the connecting element 39 should be structurally designed in such a way that the connecting element 39 can be pivoted up or down out of the direction of extension 17 and in doing so can be detached from the assigned chain pin 37.

Due to such a detachability of the associated chain pin 37, to be effected particularly by pivoting the connecting element 39, the connecting element 39 can be released at least at the respective end 41, 43 from the coupling to the conveyor chain 5 without having to remove the connecting element 39 in axial direction from the associated chain pin 35. As described in more detail below, this allows for the realization of a simple option of being able to mount or disassemble in a simple manner the herein proposed conveyor chain 5 together with the connecting elements 39 arranged thereon, or to be able to replace individual connecting elements 39.

According to one embodiment, the connecting element 39 has a passage opening 45, 47 at both the front and the rear end 41, 43 through which the respective chain pin 37 extends when the respectively associated chain pin 37 is in the coupled state. The connecting element 39 has a lateral opening 49 at one of these passage openings 45 such that, after a bushing 53 is removed, the associated chain pin 37 moves out of the passage opening 45, 47 through the lateral opening 49 and as a result can be released from the coupling with the associated chain pin 37.

In other words, at each of the opposite ends 41, 43 of the connecting element 39, passage openings 45, 47 are supposed to be formed, through which the preferably elongated chain pins 37 can extend. These passage openings 45, 47 can be dimensioned such that, for example, in the case of the front passage opening 45, a partial interlocking connection with the cylindrical elongated chain pin 37 is created.

Accordingly, the front passage opening 45 can be designed to be round at least in sections and with approximately the same diameter as the diameter of the elongated chain pin 37. The rear passage opening 47 in the connecting element 39 can preferably be designed to be elongated, for example, rectangular or quasi-rectangular. A length of said rear passage opening 47 in the extension direction 17 can correspond to the distance d, by which the connecting element 39 is supposed to be able to be displaced relative to the associated chain pin 35. A height of said rear passage opening 47 can correspond approximately to the diameter of the associated chain pin 35.

In this context, at least one of the two passage openings 45, 47 cannot be closed in an annular manner, but rather can be open on one side. In other words, one end 41, 43 of the connecting element 39 can be designed with a passage opening 45 in the form of a laterally open, largely round eye. Because of the lateral opening 49, this passage opening 45 can, for example, be opened in a U-shape or a Ω-shape.

The lateral opening 49 on the passage opening 45 allows the connecting element 39 to be detached as described above by pivoting the connecting element 39. For example, to mount a connecting element 39, its rear end 43 can be pushed axially onto the assigned chain pin 37 and then the front end 41 can be coupled to the other assigned chain pin 37 by pivoting the connecting element 39 downward and thereby pushing the associated chain pin 37 through lateral opening 49 into the passage opening 45 in order to bring about the desired coupling between the chain formed from chain links 27 and the connecting element 39.

According to one embodiment, adjacent connecting elements 39 can overlap one another in the extension direction 17, and the rear end 43 of a front connecting element 39 and the front end 41 of a rear connecting element 39 can each be coupled to a common chain pin 37.

In other words, the connecting elements 39 of the conveyor chain 5 described herein can, similarly to the brackets 29 of the chain links 27, overlap in the extension direction 17, and adjacent connecting elements 39 can each be coupled with one of their ends 41, 43 to a common chain pin 37.

All connecting elements 39 of the conveyor chain 5 can thus preferably be designed to be identical, for example, having the same geometry. The chain formed by the connecting elements 39 can thus have a simple design, and only one type of connecting elements 39 has to be produced, stored, and finally mounted. For the parallel-running and opposite conveyor chains 5 of a pallet belt 3, two minor-symmetrical types of connecting elements 39 (right/left) may be required.

For example, the connecting elements 39 can be formed as cranked members, and so, for example, all the rear ends 43 of the connecting elements 39 are arranged closer to the chain links 27 on the associated chain pins 37 than the front ends 41 of adjacent connecting elements 39 arranged on the same chain pin 37.

In such a configuration, the rear ends 43 of the connecting elements 39, for mounting the conveyor chain 5, can be shifted with the annular closed passage opening 47 axially over an associated chain pin 37. After all the connecting elements 39 have been attached to the assigned chain pins 37 in this way, the coupling pins 39 can then be pivoted in order to be able to engage with their front end 41 in an adjacent elongated chain pin 37. Even though the connecting elements 39 overlap one another in the extension direction, they can be assembled in this manner to practically form a chain parallel to the chain links 27 on the conveyor chain 5.

According to one embodiment, the rear end 43 of the connecting elements 39 can each be held on the associated chain pin 35, 37 via a sliding element 51. For this purpose, the sliding element 51 can be interposed between opposite surfaces of the connecting element 39 and the chain pin 37.

In other words, the connecting elements 39 can each be coupled at their rear end 43 to the associated chain pin 37 via the sliding element 51. The sliding element 51 can in certain directions thereby provide a desired force-locking connection, or in certain directions provide a specific interlocking connection between the elongated chain pin 37 and, for example, inner surfaces in the area of the passage opening 47 in the connecting element 39.

According to a specific embodiment, the connecting element 39 can, at its rear end 43, have an elongated hole-shaped passage opening 47 with parallel inner surfaces. The sliding element 51 can then have an outer contour with parallel outer surfaces adjoining the inner surfaces of the passage opening 47.

In other words, the sliding element 51 can have, for example, a rectangular or quasi-rectangular outer contour, and the passage opening 47 in the rear end 43 of the connecting element 39 can also be rectangular or quasi-rectangular. A height of the sliding element 51 can correspond to a height of the passage opening 47. However, a length of the sliding element 51 should be shorter than a length of the passage opening 47. For example, the length of the sliding element 51 can be less than 50% or less than 30% of the length of the passage opening. Due to such a configuration, the sliding element 51 can move linearly within the passage opening 47, for example, by the distance d described above. In other words, the sliding element 51 can be designed as a square component and form a linear guide with the passage opening 47 formed as an elongated hole in the connecting element 39.

In other words, a linear guide for the connecting element 39 can be effected by the design of the sliding element 51 and the passage opening 47 in order to compensate for the chord shortening occurring during the deflection of the conveyor chain 5.

Due to the configuration of the sliding element 51 and the passage opening 47 with surfaces parallel to one another, a contact surface, on which the sliding element 51 bears against the inner surface of the passage opening 47 on the connecting element 39, can be increased. In this manner, surface pressure can be reduced when the connecting element 39 is connected to the associated chain pin 37. As a result, for example, wear on the conveyor chain 5 can be reduced.

As already described, the front end 41 of the connecting element 39 is held on the associated chain pin 35 via a bushing 53.

The bushing 53 can be interposed between an outer surface of the associated chain pin 37 and an inner surface in the area of the passage opening 45 of the connecting element 39. The bushing 53 can be closed annularly, and designed particularly to be circular or cylindrical. During assembly of the conveyor chain 5, for example after the front end 41 of the connecting element 39 with its lateral opening 49 has been pivoted over the associated chain pin 37, the bushing 53 can be pushed in an axial direction onto the extended chain pin 37. As a result, an interlocking connection between the elongated chain pin 37 and the connecting element 39 in the area of its front laterally open passage opening 45 can be generated.

According to one embodiment, the sliding element 51 and/or the bushing 53 can be made at least partially of a polymer material, for example, comprising a polymer material or, for example, be coated with a polymer material. Preferably, polymer materials can be used, which have sufficient strength but also allow for sufficient sliding properties between the sliding element 51 or the bushing 53 and the associated chain pins 35 and connecting elements 39 which are to be coupled and move pivotably relative to these components. For example, thermosets or thermoplastics, such as PA, PMMA, POM, GRP, CFRP, PVC, PTFE, and the like, can be used as polymer materials.

According to one embodiment, the connecting elements 39 can be made of metal. As a result, the connecting elements 39 have a sufficient mechanical stability in order to be able to act as an intermediate link between the pallets 7 attached thereto and the coupled chain links 27 of the conveyor chain 5 and, for example, to absorb tensile forces of the conveyor chain in case of a fracture of a chain link For example, high-strength metals, such as steel, can be used.

According to one embodiment, one guide roller 55 each can additionally be arranged at least on some of the chain pins 35, 37, wherein the guide roller 55 should be rotatably mounted relative to the respective chain pin 35, 37 about its central longitudinal axis M. Similarly to conventional conveyor chains, such guide rollers 55 can be used to support the conveyor chain 5 against guide rails (not depicted) and to guide it during a movement along the extension direction 17, or to reduce friction between the conveyor chain 5 and a supporting and/or guiding structure. The guide rollers 55 can be made, for example, from metal or a polymer material. The guide rollers 55 can be mounted with reduced friction on the respective chain pins 35, 37, for example, via a plain bearing. The guide rollers 55 can be arranged between the chain links and the connecting elements 39.

In addition to the components already mentioned and described in detail, further components can be provided on the conveyor chain 5. For example, one or more sliding disks or spacers 57 can be provided axially along the elongated chain pins 37. In addition, one fixing screw 59 each can be provided at one axial end of the elongated chain pin 37 and can be screwed to the respective elongated chain pin 37, and in this way the components coupled to said chain pin 37, for example, in particular the connecting elements 39 as well as the sliding elements 51 and the bushings 53, can be secured against axial slipping from the chain pin 37.

In the following, possible designs and embodiments of a method for mounting a conveyor chain 5, having the features described herein, shall be described. Furthermore, possible designs and embodiments of a method for mounting a pallet belt 3 with such a conveyor chain 5 and a method for replacing a connecting element 39 in such a conveyor chain 5 shall be described.

First, a plurality of elongated chain links 27 and a plurality of elongated connecting elements 39 are provided. The chain links 27 and the connecting elements 39 can have structural and/or functional properties as described above. In particular, the chain links 27 can be stressable with regard to tension by means of chain pins 35, 37, and pivotably coupled to one another transversely to a respective central longitudinal axis M of the chain pins 35, 37. Subsequently, the connecting elements 39 can be coupled to one another and to the chain links 27 in one coupling process. For this purpose, not all method steps must necessarily be executed at the same installation site and within a single time interval. Specifically, for example, the chain links 27 and the chain pins 35, 37 can already be obtained as a completely assembled chain from a subcontractor specializing in such chains.

The coupling process can be designed such that the mounted conveyor chain 5 eventually has all the structural and/or functional properties described herein. In particular, the coupling process is designed such that, in case of the completely assembled conveyor chain 5:
  the connecting elements 39 are arranged one behind the other parallel to the extension direction 17 of the conveyor chain 5;
  each of the connecting elements 39 is coupled at a front end 41 to an associated first one of the chain pins 35, 37, and at a rear end 43, it is coupled to an associated second one of the chain pins 35, 37, wherein a connecting element spacing distance T2 is an integer multiple of the chain spacing distance T1;
  two connecting elements 39 adjacent in the extension direction 17 overlap one another and a rear end 43 of a front one of the two connecting elements 39 and a front end of a rear one of the two connecting elements 39 is each coupled to a common chain pin 35, 37, and the adjacent connecting elements 39 are thus pivotably coupled to one another transversely to the extension direction 17;
  the front end 41 of each of the connecting elements 39 is coupled pivotably and in a coaxially positioned manner to the respective first chain pin 35, 37; and
  the rear end 43 of each of the connecting elements 39 is pivotably coupled to the respective second chain pin 35, 37 and guided in the extension direction 17 in a displaceably linear manner over a predetermined distance d.

During the coupling process of the connecting elements 39, each of the connecting elements 39 can first be coupled with a first end to the associated chain pin 35, 37 by sliding it in the axial direction. Then, at least one of the connecting elements 39, or alternatively, some or each of the connecting elements 39, is/are coupled in a tangential direction to the associated chain pin 35, 37 with an opposite second end by pivoting in a pivoting direction 61 (see, for example, FIG. 4a).

In other words, for mounting the conveyor chain 5 with the chain formed by the connecting elements 39, each of the connecting elements 39 is first coupled axially with a first end to one of the chain pins 35. For example, the respective end can be pushed over one of the elongated chain pins 37 with a passage opening 45, 47 provided on said end. Subsequently, at least one of the connecting elements 39 is pivoted in the pivot direction 61 about the central longitudinal axis M of the chain pin 37, with which it is already coupled at its first end, and it is eventually coupled in the tangential direction to the associated other chain pin 35, 37.

In principle, it is possible to first axially couple all the connecting elements 39 to be provided on the conveyor chain 5 with their first end to the respectively associated chain pins 37, and, by pivoting, subsequently couple the respective second ends of the connecting elements 39 in the tangential direction to adjacent chain pins 37.

However, alternatively, it is also possible to axially couple the connecting elements 39 successively with each of their two ends to associated chain pins 37. With the exception of the last connecting element 39, this can be achieved for all connecting elements 39 to be provided on the continuously closed conveyor chain 5. Said last connecting element 39 cannot be mounted in the same manner because one of the two chain pins 37, to which it is supposed to be coupled, is already "blocked" by another, previously mounted connecting element 39. Therefore, at least this last connecting element 39 must be pivoted with its second end in the pivoting direction 61 in order to be able to subsequently couple it tangentially to the "blocked" chain pin 37.

It must be noted that, depending on the design of the connecting elements 39, their front and rear ends can correspond to the first and second ends 41, 43 described herein before, or vice versa.

In the example shown in the drawings, the first end of the connecting element 39 corresponds to the rear end 43, which is pushed with its elongated hole-shaped and annularly enclosed passage opening 47 onto one of the elongated chain pins 37. After the connecting element 39 is coupled with its first end to the associated chain pin 37, said connecting element 39 is then pivoted in the pivot direction 61 and thus moved with its opposite second front end 41 in the tangential direction and thereby coupled to the associated other chain pin 37.

According to one embodiment, each connecting element 39 is detachably coupled at its second end in a direction transversely to the extension direction 17 and transversely to the central longitudinal axis M of the associated chain pin 37 to the associated chain pin 37.

In other words, each of the connecting elements 39 is supposed to be coupled, preferably at least at its second end, to the associated chain pin 37 such that it can be released again from the coupling in a direction transversely to the extension direction 17 and transversely to the central longitudinal axis M of the associated chain pin 37.

In particular, according to one embodiment, the connecting element 39 can have a passage opening 45, 47 at each of the first and second ends. The respective chain pin 37 can extend through these passage openings 45, 47 in the state coupled to the respective chain pin 37. The connecting element 39 has a lateral opening 49 at least at the passage opening 45 at the second end such that the associated chain pin 37 can be moved through the lateral opening 49 out of the passage opening 45 or into the passage opening 45. During the coupling process, each connecting element 39 is then pivoted in the pivoting direction 61 in such a way that the associated chain pin 37 passes through the lateral opening 49 in the second end of the connecting element 39 into the passage opening 45 there.

In other words, the connecting element 39 can have passage openings 45, 47 at both ends 41, 43 through which the respectively associated chain pin 37 can extend in the coupled state. At the first end to be axially coupled, the passage opening 47 there can be surrounded by a closed border. At the second end to be coupled by the pivoting of the connecting element 39 in the pivoting direction 61, however, the passage opening 45 there should not be surrounded by a closed border, but rather have a lateral opening 49. This lateral opening 49 can be wide enough that, when the connecting element 39 is pivoted, the associated chain pin 35 can be moved tangentially through this lateral opening 49 until it is inside the passage opening 45 at the end of the pivoting movement.

According to one embodiment, the first end of the connecting elements 39 can each be held on the associated chain pin 37 via a sliding element 51. Prior to the axial shifting of the connecting element 39, the sliding element 51 is in this case arranged on the associated chain pin 39 and then interposed between opposite surfaces of the connecting element 39 and the associated chain pin 37 during the axial shifting of the connecting element 39.

In other words, the first end of a connecting element 39 can be coupled to the associated chain pin 37 in that it does not directly bear against said associated chain pin 37 but is held on the chain pin 37 via the interposed sliding element 51. As described above, said sliding element 51 can, for example, be square or rectangular and mesh with an elongated hole-shaped passage opening 47 at the first end of the connecting element 39.

During the coupling process, the sliding element 51 can in this case first be attached to the associated chain pin 37, for example, in that it is pushed axially onto the chain pin 37. The sliding element 51 thus fastened can then be axially coupled to the first end of the connecting element 39, for example, the connecting element 39 is pushed axially onto the sliding element 51.

According to a specific embodiment, the second end of the connecting element 39 can be held on the associated chain pin 37 via a bushing 53. In this case, the bushing 53 can be arranged on the associated chain pin 37 after pivoting the connecting element 39 in the tangential direction. In this case, the bushing 53 can be designed such that, after said arranging, it interlockingly interacts with the passage opening 45 in the second end of the connecting element 39, thus blocking a pivoting of the connecting element 39 against the pivot direction 61.

In other words, the second end of the connecting element 39 can also be coupled to the associated chain pin 37 in that it does not directly bear against said chain pin 37 but is held on the chain pin 37 via the interposed bushing 53.

During the coupling process, the second end with its passage opening 45 can for this purpose first be pivoted via the chain pin 37. Subsequently, the second end can be firmly attached to the chain pin 37 by means of the bushing 53. For this purpose, the bushing 53 can be pushed, for example, axially over the chain pin 37.

Said bushing 53 can be designed such that it fills an initially existing gap between the chain pin 37 and the edge of the passage opening 45 in the second end of the connecting element 39, thus being able to interact with said passage opening 45 in an interlocking manner. For this purpose, the bushing 53 can, for example, have a larger diameter than the lateral dimensions of the lateral opening 49 at the passage opening 45. As a result, the bushing 53, when it has been pushed onto the associated chain pin 37 and pushed into the passage opening 45, can block the pivoting of the connecting element 39 counter to the pivoting direction 61. Due to the bushing 53, the connecting element 39 is thus held in an interlocking manner on the associated chain pin 37.

According to one embodiment each connecting element 39 can, after the coupling process, be fastened with each of its ends to the respectively associated chain pin 37 by means of a fastening element 63 detachable in the axial direction.

In other words, a fastening element 63, for example, in the form of the fixing screw 59, can be securely fastened to the elongated chain pin 37 after the connecting element 39 has at first been pushed, for example, axially with its first end onto one of the elongated chain pins 37 and then pivotably meshed with its second end with an adjacent elongated chain pin 37. Said fastening element 63 can prevent a release of the connecting element 39 from the elongated chain pin 37 in the axial direction. However, the fastening element 63 itself can be released from the chain pin 37, for example, by unscrewing the fixing screw 59, so that the connecting element 39 can subsequently be pulled off from the chain pin 37 in the axial direction.

An exemplary design of the coupling process for an embodiment of the method for mounting a conveyor chain 5 as described herein can be described with reference to FIGS. 3 and 4a to 4c as follows: In order to be able to install the connecting elements 39 on the conveyor chain 5, it has elongated chain pins 37 at every third joint point. At first, guide rollers 55 are arranged at said chain pins 37, for example, pushed axially onto said chain pins 37. Then the sliding elements 51 are pushed axially onto the elongated chain pins 37. Subsequently, the connecting elements 39 are mounted. For this purpose, the connecting elements 39 can each be pushed axially with their first end onto the chain pins 37 and then pivoted in the pivot direction 61 in order to couple the respective second ends to adjacent chain pins 37. With the exception of the last connecting element 39, all connecting elements 39 can alternatively be pushed axially with their two ends in succession onto adjacent elongated chain pins 37. However, at least the last connecting element 39 cannot be pushed axially in such manner; instead, it must be tangentially pivoted with its second end in order to be coupled to the associated chain pin 37. Subsequently, the connecting elements 39 can be secured, for example, by axial insertion of the bushings 53 and their axial fastening to the elongated chain pins 37 by means of the fixing screws 59. If necessary, sliding disks and/or spacers 57, which can particularly distance flanks of the connecting elements 39 from one another, can also be provided between the individual elements.

The conveyor chain 5 described herein or the conveyor chain 5 mounted with the method described herein can allow for a particularly simple replacement of connecting elements 39 in the conveyor chain 5.

In a method used for this purpose, the connecting element 39 to be replaced and, if necessary, a connecting element 39 adjacent to it, is pivoted with its second end in the tangential direction counter to the pivoting direction 61, in order to thereby decouple the second end from the associated chain pin 37. The connecting element 39 to be replaced is then released from the associated chain pin 37 by the first end being pulled off in the axial direction. The connecting element 39 released in this manner is then replaced by a replacement connecting element. Similarly to the original mounting of the conveyor chain 5, said replacement connecting element is then at first coupled with its first end to the associated chain pin 37 by shifting in the axial direction, and then coupled with an opposite second end in the tangential direction to the associated chain pin 37 by a subsequent pivoting in the pivot direction 61.

Particularly in the course of such a replacement of a connecting element 39, it is advantageous that each individual connecting element 39 of the conveyor chain 5 is detachably coupled at its second end with the associated chain pin 37, and said coupling cannot be effected by an axial pulling off of the connecting element 39 but by a tangential pivoting of the connecting element 39. Even though adjacent connecting elements 39 overlap one another in the extension direction 17, it is possible to achieve that an individual connecting element 39 can be pivotably detached at its second end from the chain without having to also detach the adjacent connecting elements 39 at its first end and for this purpose pull it off axially from the chain pin 37.

As a result, replacing individual connecting elements 39 and/or pallets 7 attached thereto can be simplified considerably. In particular, worn connecting elements 39 can be replaced individually and in a simple manner.

In other words, in the example shown in the drawings, a single connecting element 39 can be removed, for example, during maintenance, by removing the two fixing screws 59 and bushings 53 on the associated elongated chain pins 37 of the conveyor chain 5 in the area of said connecting element 39. Then, the overlapping end of the adjacent connecting element 39 must be pivoted. As a result, the connecting element 39 to be removed is now exposed and can itself be detached from the chain. For this purpose, the front end 41 can first be pivoted upwardly, and then the rear end 43 can be pulled off axially from the chain pin 37 associated thereto.

With the conveyor chain 5 described herein or the conveyor chain 5 mounted according to the method described herein, a pallet belt 3 for a moving walkway 1 can also be mounted in an advantageous manner.

For this purpose, two conveyor chains 5 are initially mounted according to the method presented herein and then arranged parallel to one another. Subsequently, a plurality of pallets 7 is mounted on the two conveyor chains 5. For that purpose, the pallets 7 are arranged one behind the other in the extension direction 17 of the conveyor chains 5, and each of the pallets 7 is fastened at a first lateral end to one of the connecting elements 39 of the first conveyor chain 5 and at an opposite second lateral end to one of the connecting elements 39 of the second conveyor chain 5.

In other words, the pallet belt 3 can be formed by two conveyor chains 5 supplemented with connecting elements 39 and the pallets 7 screwed to the connecting elements 39. For example, in case of a factory assembly, a mounting device can be used, having two chain guides adjustable to the different pallet widths as the positioning part. This is realized in the simplest manner, for example, with a rotatably mounted axle with sprockets. The mounting device can be fully automated by means of placement machines, for example, in the form of robots.

Finally, it should be noted that terms such as "have," "comprising," etc. do not exclude any other elements or steps, and terms such as "an" or "a" do not exclude a multiplicity. Furthermore, it should be noted that features or steps that have been described with reference to one of the above embodiments may also be used in combination with other features or steps of other embodiments described above. Reference signs in the claims should not be considered to be limiting.

The invention claimed is:

1. A method for mounting a conveyor chain for a pallet belt of a moving walkway, the method comprising:
   providing a plurality of elongated chain links connected by a plurality of chain pins so as to be arranged at a chain spacing distance one behind the other in an extension direction of a conveyor chain of the moving walkway, wherein two chain links adjacent in the extension direction are coupled together in a joint area by a chain pin, wherein each of the two chain links can pivot with respect to the other about a central longitudinal axis of the chain pin;
   providing a plurality of elongated connecting elements that are configured to attach to pallets of the pallet belt;
   coupling the connecting elements in a coupling process to one another and to the chain links, wherein:
      the connecting elements are arranged one behind the other parallel to the extension direction of the conveyor chain,
      each of the connecting elements is coupled at a front end to an associated first chain pin and at a rear end to an associated second chain pin, wherein the first chain pin and the second chain pin couple chain links, and wherein a connecting element spacing distance between the first and second chain pins is an integer multiple of the chain spacing distance, and
      the connecting elements are coupled to the chain pins such that they can be pivoted transversely to the extension direction about the central longitudinal axes of the chain pins.

2. The method of claim 1, wherein two connecting elements adjacent in the extension direction are arranged so as to overlap each other and a rear end of a first of the two connecting elements and a front end of a second of the two connecting elements are each coupled to a common chain pin.

3. The method of claim 2, wherein:
the front end of each of the connecting elements can be coupled pivotably and in a coaxially positioned manner to the respective first chain pin, and the rear end of each of the connecting elements can be pivotably coupled to the respective second chain pin and guided in the extension direction in a displaceably linear manner over a predetermined distance; and
during the coupling process at least one of the connecting elements is initially coupled to the associated chain pin with a first of the two ends by sliding it in an axial direction and then, by pivoting in a pivoting direction, is coupled in a tangential direction to the chain pin that is associated with this end with a second end that is opposite the first end.

4. The method of claim 3, wherein each connecting element is detachably coupled at its second end in a direction transversely to the extension direction and transversely to the central longitudinal axis of the associated chain pin to the associated second chain pin.

5. The method of claim 3, wherein:
the connecting element has a passage opening at each of the first and second ends through which the respective chain pin extends when it is in the coupled state with the respective chain pin, and wherein the connecting element, at least at the passage opening on the second end, has a lateral opening such that the chain pin can be moved through the lateral opening out of the passage opening during a decoupling process or into the passage opening during a coupling process; and
wherein each connecting element is pivoted in the pivoting direction during the coupling process in such a way that the associated second chain pin passes through the lateral opening in the second end of the connecting element into the passage opening located there.

6. The method of claim 3, wherein the first end of each of the connecting elements is held on the associated chain pin via a sliding element, wherein, prior to the axial shifting of the connecting element, the sliding element is arranged on the associated chain pin and interposed between opposite surfaces of the connecting element and the associated chain pin during the axial shifting of the connecting element.

7. The method of claim 3, wherein the second end of the connecting element is held via a bushing on the associated chain pin, wherein the bushing, after the connecting element pivots in the tangential direction, is arranged on the associated chain pin and is configured to interact interlockingly with the passage opening in the second end of the connecting element and thereby blocks pivoting of the connecting element counter to the pivoting direction.

8. The method of claim 3, wherein after the coupling process, each connecting element can be fastened with each of its ends to the respectively associated chain pin by a fastening element that is detachable in the axial direction.

9. A method for replacing a connecting element in a conveyor chain which has been mounted in accordance with the method of claim 3, wherein the method comprises:
pivoting the connecting element to be replaced counter to the pivoting direction with its second end in the tangential direction in order to thereby decouple the second end from the associated second chain pin, and then detaching the connecting element to be replaced by pulling off the first end in the axial direction of the associated first chain pin;
replacing the connecting element released in this way with a replacement connecting element;
coupling the replacement connecting element first at a first end to the associated first chain pin by sliding it in the axial direction and then coupling the replacement connecting element at an opposite second end to the associated second chain pin by pivoting the replacement connecting element in the pivoting direction.

10. A method for mounting a pallet belt for a moving walkway, the method comprising:
mounting a first and a second conveyor chain according to the method of claim 1;
arranging the two conveyor chains parallel to one another; and
attaching a plurality of pallets to the two conveyor chains, wherein the pallets are arranged one behind the other in the extension direction of the conveyor chains;
wherein each of the pallets is fastened at a first lateral end to one of the connecting elements of the first conveyor chain and at an opposite second lateral end to one of the connecting elements of the second conveyor chain.

11. A method for mounting a conveyor chain for a pallet belt of a moving walkway, the method comprising:
providing a plurality of elongated chain links connected by a plurality of chain pins so as to be arranged at a chain spacing distance one behind the other in an extension direction of a conveyor chain of the moving walkway, wherein two chain links adjacent in the extension direction are coupled together in a joint area by a chain pin, wherein each of the two chain links can pivot with respect to the other about a central longitudinal axis of the chain pin;
providing a plurality of elongated connecting elements to which pallets can be attached;
coupling the connecting elements in a coupling process to one another and to the chain links, wherein:
the connecting elements are arranged one behind the other parallel to the extension direction of the conveyor chain,
each of the connecting elements is coupled at a front end to an associated first chain pin and at a rear end to an associated second chain pin, wherein the first chain pin and the second chain pin couple chain links, and wherein a connecting element spacing distance between the first and second chain pins is an integer multiple of the chain spacing distance,
the connecting elements are coupled to the chain pins such that they can be pivoted transversely to the extension direction about the central longitudinal axes of the chain pins,
two connecting elements adjacent in the extension direction are arranged so as to overlap each other and a rear end of a first of the two connecting elements and a front end of a second of the two connecting elements are each coupled to a common chain pin,
the front end of each of the connecting elements can be coupled pivotably and in a coaxially positioned manner to the respective first chain pin, and the rear end of each of the connecting elements can be pivotably coupled to the respective second chain pin and guided in the extension direction in a displaceably linear manner over a predetermined distance, and during the coupling process at least one of the connecting elements is initially coupled to the associated chain pin with a first of the two ends by sliding it in an axial direction and then, by pivoting in a pivoting direction, is coupled in a tangential direction to the chain pin that is associated with this end with a second end that is opposite the first end.

12. The method of claim 11, wherein each connecting element is detachably coupled at its second end in a direction transversely to the extension direction and transversely to the central longitudinal axis of the associated chain pin to the associated second chain pin.

13. The method of claim 11, wherein:
the connecting element has a passage opening at each of the first and second ends through which the respective chain pin extends when it is in the coupled state with the respective chain pin, and wherein the connecting element, at least at the passage opening on the second end, has a lateral opening such that the chain pin can be moved through the lateral opening out of the passage opening during a decoupling process or into the passage opening during a coupling process; and
wherein each connecting element is pivoted in the pivoting direction during the coupling process in such a way that the associated second chain pin passes through the lateral opening in the second end of the connecting element into the passage opening located there.

14. The method of claim 11, wherein the first end of each of the connecting elements is held on the associated chain pin via a sliding element, wherein, prior to the axial shifting of the connecting element, the sliding element is arranged on the associated chain pin and interposed between opposite surfaces of the connecting element and the associated chain pin during the axial shifting of the connecting element.

15. The method of claim 11, wherein the second end of the connecting element is held via a bushing on the associated chain pin, wherein the bushing, after the connecting element pivots in the tangential direction, is arranged on the associated chain pin and is configured to interact interlockingly with the passage opening in the second end of the connecting element and thereby blocks pivoting of the connecting element counter to the pivoting direction.

16. The method of claim 11, wherein after the coupling process, each connecting element can be fastened with each of its ends to the respectively associated chain pin by a fastening element that is detachable in the axial direction.

17. A method for replacing a connecting element in a conveyor chain which has been mounted in accordance with the method of claim 11, wherein the method comprises:
pivoting the connecting element to be replaced counter to the pivoting direction with its second end in the tangential direction in order to thereby decouple the second end from the associated second chain pin, and then detaching the connecting element to be replaced by pulling off the first end in the axial direction of the associated first chain pin;
replacing the connecting element released in this way with a replacement connecting element;
coupling the replacement connecting element first at a first end to the associated first chain pin by sliding it in the axial direction and then coupling the replacement connecting element at an opposite second end to the associated second chain pin by pivoting the replacement connecting element in the pivoting direction.

* * * * *